United States Patent
Seshadri (10) Patent No.: US 8,669,862 B2
(45) Date of Patent: Mar. 11, 2014

(54) COMMUNICATION DEVICE INCLUDING LOCAL LOCATION INFORMATION

(75) Inventor: Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 671 days.

(21) Appl. No.: 12/627,819

(22) Filed: Nov. 30, 2009

(65) Prior Publication Data

US 2011/0074547 A1    Mar. 31, 2011

Related U.S. Application Data

(60) Provisional application No. 61/246,322, filed on Sep. 28, 2009.

(51) Int. Cl.
*G08B 1/08*    (2006.01)

(52) U.S. Cl.
USPC .......... 340/539.11; 340/539.13; 340/8.1; 455/414.2

(58) Field of Classification Search
USPC .............. 340/8.1; 455/404.2, 456.1
See application file for complete search history.

(56) References Cited

U.S. PATENT DOCUMENTS

| | | | |
|---|---|---|---|
| 6,999,780 B1 * | 2/2006 | Zhao | 455/456.5 |
| 2002/0055362 A1 * | 5/2002 | Aoyama | 455/456 |
| 2003/0036404 A1 * | 2/2003 | Adachi et al. | 455/522 |
| 2009/0003659 A1 * | 1/2009 | Forstall et al. | 382/113 |
| 2009/0204354 A1 * | 8/2009 | Davis et al. | 702/89 |
| 2010/0291949 A1 * | 11/2010 | Shapira et al. | 455/456.1 |

OTHER PUBLICATIONS

Pahlavan, Kaveh, "Indoor Geolocation Science and Technology", IEEE Communications Magazine, Feb. 2002.*

* cited by examiner

*Primary Examiner* — Daniel Wu
*Assistant Examiner* — Frederick Ott
(74) *Attorney, Agent, or Firm* — Garlick & Markison; Randy W. Lacasse

(57) ABSTRACT

A device includes a processing module and a radio section. The processing module obtains location information regarding the device and converts it into a location signal. The radio section converts the location signal into a location wireless signal and transmits it within a local coverage area. A handheld device may use the location wireless signal to determine its location within a building.

18 Claims, 7 Drawing Sheets

| location information 60 | |
|---|---|
| geographic coordinates | 39°31'12"N, 76°61'18"W |
| altitude | na |
| physical address of a building | 1200 S. 1st Street, Baltimore, MA |
| building floor number | 28th |
| elevation | |
| physical building location | na |
| descriptor | front entry closet |
| blueprints of the building | na |

| location information 62 | |
|---|---|
| geographic coordinates | 39°31'12"N, 76°61'18"W |
| altitude | na |
| physical address of a building | 1200 S. 1st Street, Baltimore, MA |
| building floor number | 26th |
| elevation | |
| physical building location | na |
| descriptor | master bedroom closet |
| blueprints of the building | attached |

COMMUNICATION DEVICE INCLUDING LOCAL LOCATION INFORMATION

CROSS REFERENCE TO RELATED PATENTS

This invention is claiming priority under 35 USC §119(e) to a provisionally filed patent application having the same title as the present patent application, a filing date of Sep. 28, 2009, and an application No. of 61/246,322.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to communication systems and more particularly to devices within such systems.

2. Description of Related Art

A civilian-use global positioning system (GPS) includes a constellation of synchronized satellites in medium earth orbit that transmit precise wireless signals. The wireless signals are transmitted utilizes a frequency of 1.57542 GHz and a code division multiple access (CDMA) modulation scheme. Each wireless signal includes a timestamp of when the signals are sent, orbital information of the satellites, and a unique pseudo-random sequence code.

A GPS receiver needs to receive at least four precise wireless signals from four different GPS satellites to determine its location, which includes an altitude component. If the altitude of the GPS receiver is known, then it can determine its location from three signals from three different GPS satellites. Assuming the GPS receives is receiving a sufficient number of signals, it determines it location by calculating transit times for each of the received signals (e.g., the time difference between the timestamp and when the signal is received). The GPS receiver then determines, based on the transmit times, a series of distances between itself and the corresponding satellites (e.g., the ones from which the receiver received signals). The GPS receive then calculates it location based on the series of distances using a geometric trilateration function.

While the orbit of the GPS satellites are arranged such that approximately six to ten satellites are visible with line of sight from almost anywhere on the Earth's surface, there is little margin for error. For instance, a typical GPS receiver operates with very little link margin (e.g., 5-10 dB) since it has to overcome a path loss of approximately 180 dB (e.g., decrease of signal strength from the transmitting satellite and a GPS receiver). When the GPS receiver is inside a building, its link margin is typically more than consumed by the building's penetration path losses of 5-15 dB. As such, when a GPS receiver is inside the building, it typically does not receive a sufficient number of GPS signals to determine its location.

To address the loss of a GPS receiver's ability to determine its location in a building, industry has developed several non-GPS based in-building location techniques. Such techniques include time difference of arrival (TDOA), cellular site (identification) ID, gyroscope and accelerometer, wireless RF beacons (RF-ID tags), infrared beacons, ultrasonic beacons, wireless signal strength, and angle of arrival (AOA).

The TDOA technique can locate an object in two dimensions (2D) by calculating the time difference between the receiving of three signals transmitted by three synchronized transmitters at fixed locations. The receiver's location can be calculated in three dimensions (3D) if a fourth transmitter or receiver is added. While dedicated TDOA systems address the in-building issues, they require special synchronized equipment that can be expensive. In addition, accuracy of a TDOA system may be an issue when the transmitters are on the outside of a building and the receiver is on the inside, which is amplified if floor-by-floor resolution is desired.

The cellular site ID technique broadcasts a unique cell site ID message from each cell transmitter (e.g., common to all sectors in a cell or unique to each sector in each cell). Cellular receivers receive the unique ID to determine their location. While cellular site ID systems address the in-building issues, their resolution may be an issue since the area within a sector or cell can be quite large (e.g., one mile).

The gyroscope and accelerometer technique utilizes a combination of one or more of gyroscopes and accelerometers to track the motion of a portable device. While gyroscope and accelerometer technique addresses the in-building issues, its accuracy may be an issue as the measurements drift over time, which cause errors to accumulate.

The beacon technique (e.g., wireless RF, infrared, ultrasonic beacons) sprinkles low power transmitters through a desired area where the transmitters substantially do not have overlapping coverage. Each beacon periodically transmits a unique identifier, which is received by a portable device. The device utilizes the unique identifier to determine its relative location. While the beacon technique addresses the in-building issues, it can be costly since it requires many special purpose transmitters be installed in the desired area.

The AOA technique and the wireless signal technique locate an object based on signals that are transmitted by multiple transmitters at known locations. The AOA technique calculates the angles of arrival of the signals and the wireless signal technique calculates the signal strength of the signals. From the angles or signal strengths, the location of the receiver can be determined. While these techniques address the in-building issues, they do so at the cost of extra equipment. Further, if the transmitters are on the outside of a building and the receiver is on the inside, then multipath reflections and path loss adversely affect the receiver's ability to receive the signals.

Therefore, a need exists for a communication device that addresses one of more of the in-building location issues.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
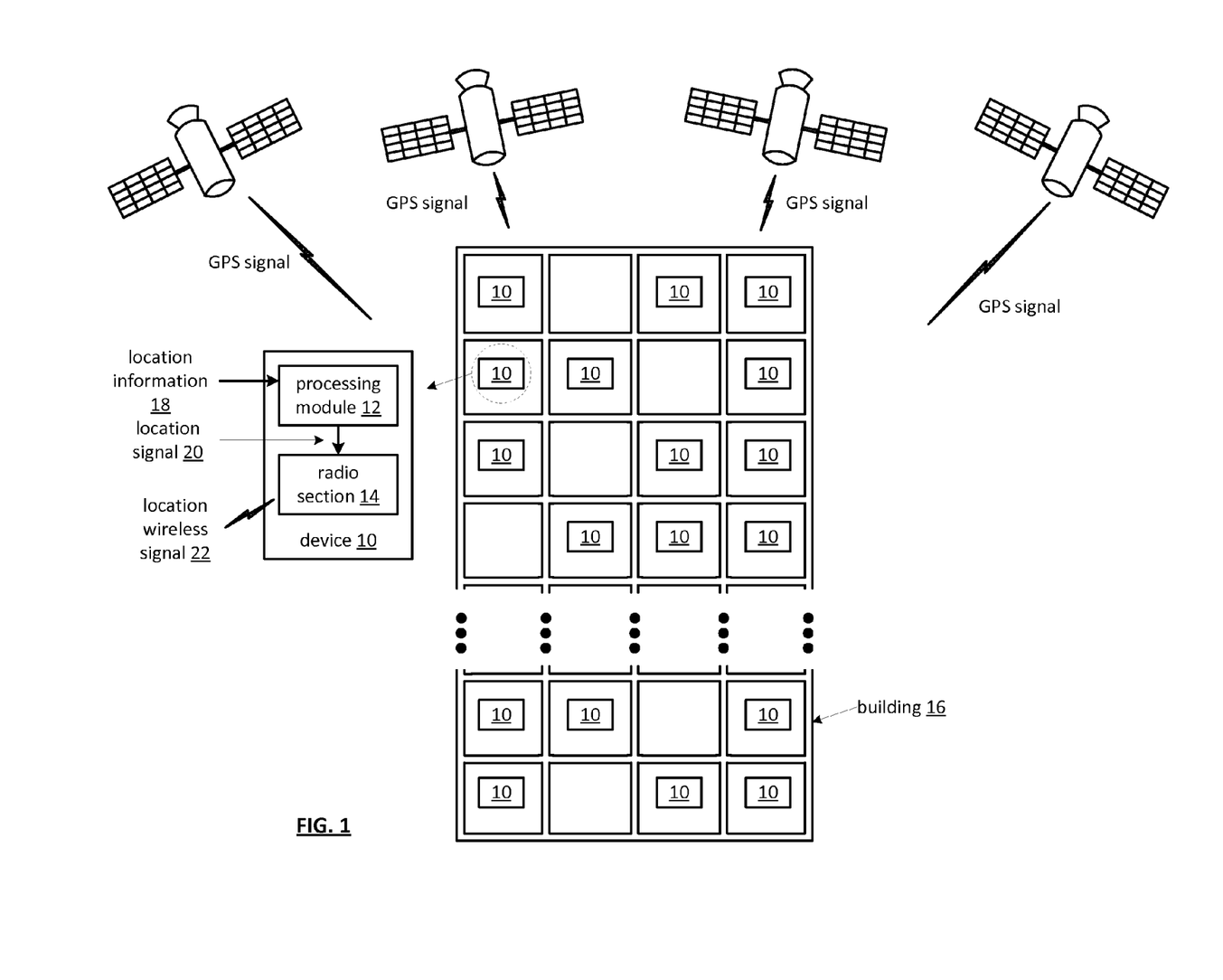
FIG. 1 is a schematic block diagram of an embodiment of a communication device in accordance with the present invention.

FIG. 1 is a schematic block diagram of an embodiment of a communication device 10 that includes a processing module 12 and a radio section 14. The device 10 may be an access point, a base station, or a portable device such as a cell phone. The communication device 10 is one of a plurality of devices 10 that are located throughout a building 16. The building 16 may have multiple floors and multiple rooms per floor. The plurality of devices 10 may be located in the building in a variety of configurations including at least one device in the building and one on the roof or perimeter of the building, one or more devices per floor, one or more devices per room, and/or any other combination.

One or more of the devices 10 include a processing module 12 and a radio section 14. The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-10. The radio section 14 may include a wireless transceiver to communicate with one or more devices 10 and other devices within a local coverage area (e.g., within proximity of the building 16). The radio section 14 will be discussed in greater detail with reference to FIG. 2.

In an example of operation, the processing module 12 obtains location information 18 regarding the device 10 and converts it into a location signal 20. The location information 18 includes one or more of geographic coordinates, altitude (e.g., in air X feet above sea level), a physical address of a building, a building floor number, an elevation (e.g., on the earth's surface x feet above a fixed reference point), a physical building location descriptor (e.g., in the closet of the master bedroom, in the front entryway, etc.), and a blueprint of the building.

The processing module 12 may obtain the location information 18 in a variety of ways. For example, the device 10 may include a GPS receiver that provides the geographic coordinates to the processing module 12. As another example, the device 10 may include memory and a user interface to enable a user or system administrator to program the geographic coordinates into the memory, which the processing module 12 may access. As yet another example, the processing module 12 may receive, via an interface of the device 10, one or more pieces of the location information from one or more of the other devices 10. For instance, one or more of the other devices may provide its geographic coordinates to the device 10, which the device uses to calculate its geographic position. As a further example, the processing module 12 may receive, via the radio section, geographic coordinates from a cellular telephone that just came in range of the device and uses to calculate its geographic location. Other types of the location information (e.g., altitude, the physical address, a floor number, elevation, a physical building location descriptor, and/or blueprints) may be obtained in a similar manner, retrieved from a server, or any other means.

The resulting location signal 20 includes the processing module's current calculation of the device's geographic location (e.g., geographic coordinates). The location signal 20 may also include other location information 18 of the device 10 (e.g., physical address, floor number, physical building location descriptor, etc.).

The radio section 14 converts the location signal 20 into a location wireless signal 22 and transmits it within the local coverage area. The location wireless signal 22 may in a format that will be readily received by other devices 10 (e.g., including cell phones) within the local coverage area.

A portable device (e.g., a cell phone) within the coverage area of the device 10 receives the location wireless signal 22 and utilizes it to determine its in-building geographic location. This is especially useful for emergency calls where the user of the phone may be somewhat incapacitated. In this instance, the cell phone transmits its location information that includes the geographic coordinates of the cell phone as derived from the wireless location signal 22 and may further include a physical address, a floor number, etc.

In another example of operation, at least some of the devices 10 communicate with each other via a wired and/or wireless network to share location information 18. In this instance, a device 10 that is located deep within the building (e.g., far from the perimeter of the building) may obtain location information 18 from other devices such that it may determine its location. Further, devices on the perimeter of the building may receive GPS signals such that their geographic coordinates are directly calculated therefrom. These devices may then provide their geographic coordinates to the deep in-building devices and may also provide GPS timing information, such that the deep in-building devices may synchronize their clocks to the GPS timing information. From this information, the deep in-building devices can accurately determine their geographic location even though they cannot directly receive GPS signals.

Figure 2:
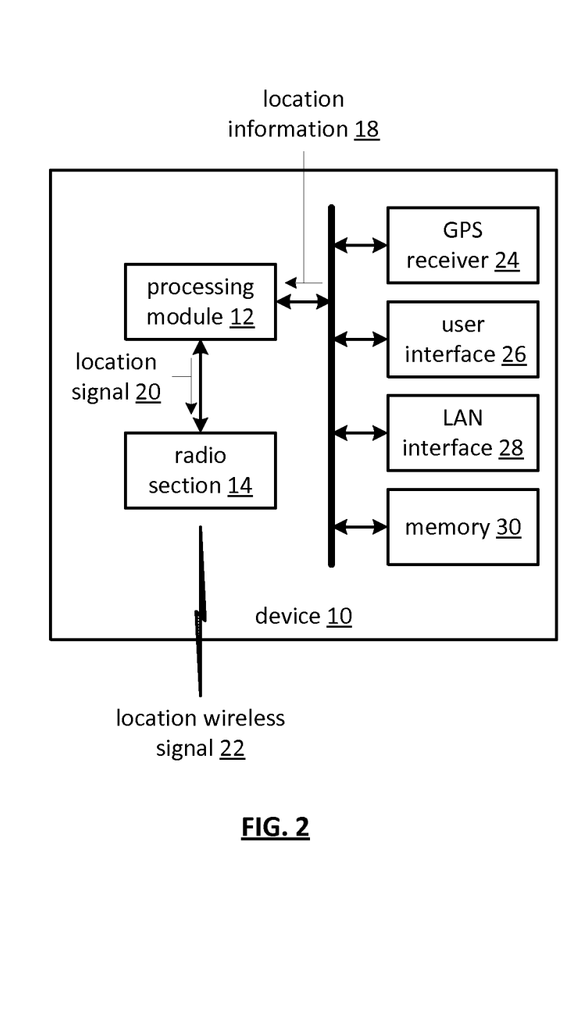
FIG. 2 is a schematic block diagram of another embodiment of a communication device in accordance with the present invention.

FIG. 2 is a schematic block diagram of another embodiment of a communication device 10 that includes the processing module 12 and the radio section 14 and may further include one or more of a GPS receiver 24, a user interface 26, a local area network (LAN) interface 28, and a memory 30. The memory 30 may be a single memory device or a plurality of memory devices. Such a memory device may be a read-only memory, random access memory, volatile memory, non-volatile memory, static memory, dynamic memory, flash memory, cache memory, and/or any device that stores digital information. The memory 30 may be used to store digital information including an operational state, the configuration information, and/or the location information.

The radio section 14 includes at least one receiver section and at least one transmitter section. Each of the receiver sections and transmitter sections function in accordance with one or more wireless protocols within one or more frequency bands. The frequency bands may be in the radio frequency (RF) range of 30 MHz to 3 GHz and/or in the millimeter wave (MMW) range of 3 GHz to 300 GHz. The wireless protocols include, but are not limited to, IEEE 802.11n, 802.11g, 802.15, ZigBee, Bluetooth, etc.

The user interface 26 includes one or more interfaces (e.g., electromechanical connections, electrical connections, optical, electrical drivers, and/or software drivers) for one or more input devices and/or output devices. For example, an input device may be a keyboard, keypad, a microphone, a touch screen, etc. and an output device may be a display, a speaker, etc.

The LAN interface 28 may be a wired interface LAN constructed in accordance with an industry standard such as IEEE 802.3 (Ethernet) and/or a wireless interface LAN constructed in accordance with an industry standard (e.g., IEEE 802.11n, 802.11g). The LAN interface 28 enables the device 10 to communicate with one or more other devices in the building. Note that, in an embodiment, the radio section 14 may function as the wireless LAN interface 28.

In an example of operation, the processing module 12 receives the location information 18 from one or more of the GPS receiver 24, the user interface 26, the LAN interface 28, and the memory 30. For example, if the device 10 includes the GPS receiver 24 and the GPS receiver 24 receives sufficient GPS signals to determine geographic coordinates, the processing module 12 receives the geographic coordinates from the GPS receiver 24. Alternatively, the user interface 28 may receive programming instructions to store geographic coordinates in memory 30. As such, the processing module 12 can retrieve the geographic coordinates from the memory 30.

In another example, the GPS receiver 24 itself does not receive sufficient GPS signals to determine geographic coordinates, but does receive some GPS signals. In this instance, the GPS receiver 24 provides, as directed by the processing module 12, raw data of the GPS signals (e.g., the timestamp, the orbital information of the satellites, and the unique pseudo-random sequence code) to memory 30. In a similar fashion, one or more other devices in the building store raw GPS data. While, individually, the raw GPS data is insufficient to determine geographic coordinates, the collective raw GPS data may be sufficient. In this instance, the devices 10 communicate via the LAN interface 28 to share the raw GPS data such that at least one of the devices can determine its geographic coordinates from the GPS signals.

As another example, the processing module 12 may receive, as location information, the geographic coordinates of other devices via the LAN interface 28. In this instance, the processing module 12 determines its geographic coordinates based on the geographic coordinates of one or more of the other devices and a geographic relationship to the one or more other devices. The geographic relationship may be determined based on how the geographic coordinates are received (an example of this will be discussed in greater detail with reference to FIG. 6) or based on known physical properties of the building. For instance, if the device is on the $10^{th}$ floor in room 1022 and the geographic coordinates of another device is on the $9^{th}$ floor in room 922, the device can determine its geographic relationship to the other device based on the physical nature of the building (e.g., directly above the other unit by one floor).

As yet another example, the processing module 12 may receive other location information (e.g., altitude, the physical address, a floor number, elevation, a physical building location descriptor, and/or blueprints) from the user interface 26, the LAN interface 28, and/or from the memory 30. Such additional location information further facilitates the processing module's ability to calculate the geographic location of its device. The processing module 12 processes the location information 18 to produce the location signal 20, which, at a minimum, includes approximate geographic coordinates of the device.

The radio section 14 converts the location signal 20 in the location wireless signal 22. The radio section 14 may transmit the location wireless signal 22 as a broadcast wireless signal and/or in accordance with a location request. For example, the processing module 12 may indicate that the location wireless signal 22 is to be broadcast at a particular interval. In this example, the processing module 12 may control the broadcasting by providing the location signal 20 to the radio section 14 at the desired times of broadcasting or the processing module may provide a signal to the radio section for when the wireless location signal 22 is to be broadcasted.

The location request may be received from a cell phone in the area of the device and/or from another device via the radio section 14, the user interface 26, and/or the LAN interface 28. In this instance, the processing module 12 interprets the request and generates the location signal 20 in accordance with the request.

Figure 3:
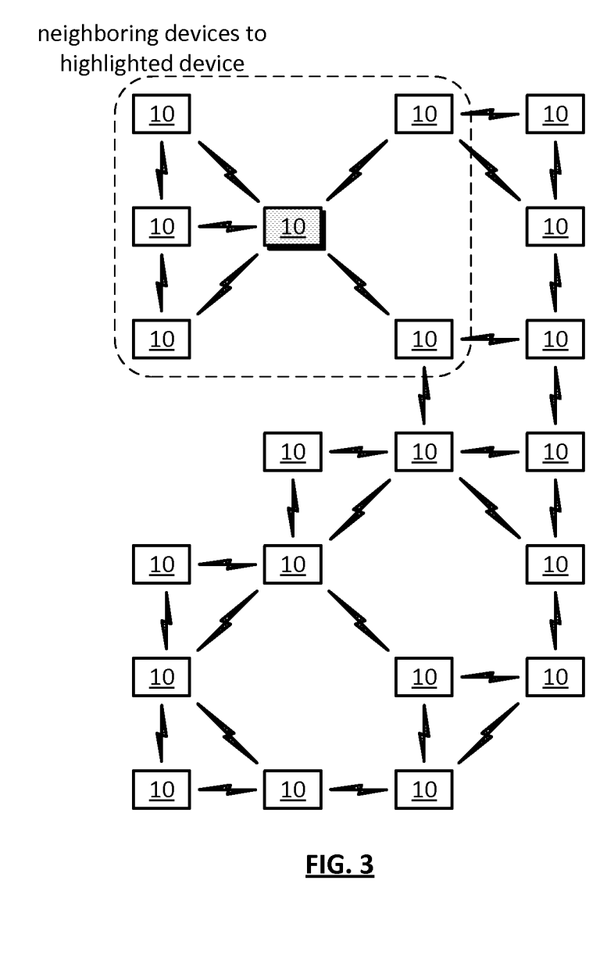
FIG. 3 is a block diagram of an embodiment of a plurality of communication devices in accordance with the present invention.

FIG. 3 is a block diagram of an embodiment of a plurality of communication devices 10 that forms a wireless mesh network. In this network, a device 10 (e.g., the highlighted one) has a neighborhood of devices 10 that it can communicate with directly. Each of the neighboring devices has its own neighborhood such that through the various devices, any device 10 can communicate with any other device (e.g., through a neighbor's neighbor). The wireless communications may be in accordance with one or more wireless communication standards (e.g., IEEE 802.11n, 802.11g, 802.15, ZigBee, Bluetooth).

In an example of operation, the highlighted device utilizes its radio section 14 and/or wireless LAN interface 28 to establish a logical connection to the device 10 in the far left of the bottom row, by creating a series of physical wireless connections from device to device. The lower level device 10 may be in a basement and unable to receive GPS signals so it transmits a request for location information from the highlighted device 10 through the logical connection.

The device 10 may determine a coordinates relationship between another device and itself utilizing characteristics of the wireless network. For example, the characteristics may include one or more of a physical layout, a TDOA or AOA measurement, and/or programmed relationship. The device 10 may determine its location coordinates based on the coordinates relationship to another device and the coordinates of another device.

Figure 4:
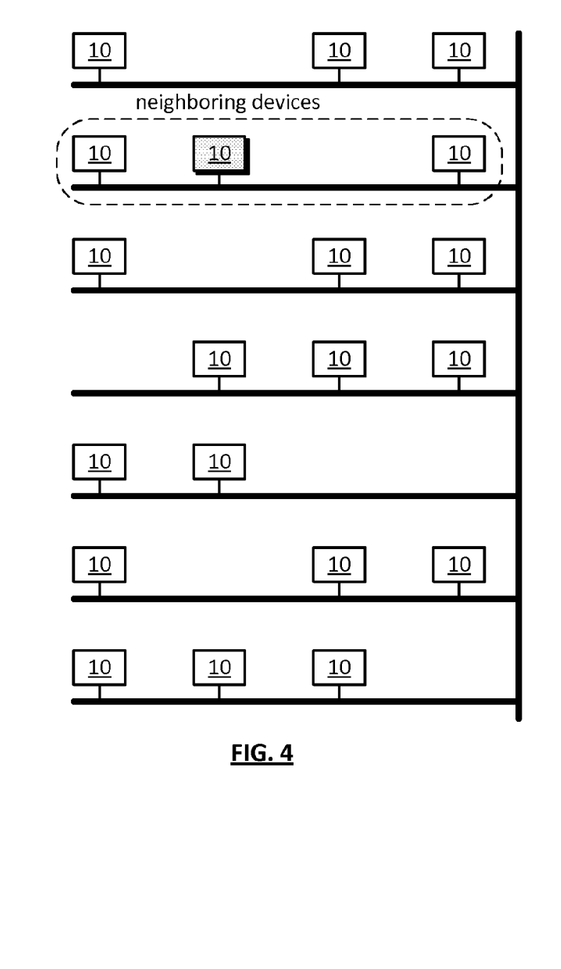
FIG. 4 is a block diagram of another embodiment of a plurality of communication devices in accordance with the present invention.

FIG. 4 is a block diagram of another embodiment of a plurality of communication devices 10 that forms a wired network. In this network, a device 10 (e.g., the highlighted one) has a neighborhood of devices 10 that it can communicate with directly on the same subsection of the wired network. Each of the neighboring devices has its own neighborhood such that through the various devices, any device 10 can communicate with any other device (e.g., through a neighbor's neighbor subsection). The wired communications may be in accordance with one or more wired communication standards such as IEEE 802.3.

In an example of operation, the highlighted device utilizes its LAN interface 28 to establish a logical connection to the device 10 in the far left of the bottom row, by directly addressing the device 10. The lower level device 10 may be in a basement and unable to receive GPS signals so it transmits a request for location information from the highlighted device 10 through the logical connection.

The device 10 may determine a coordinates relationship between another device and itself utilizing characteristics of the wired network. For example, the characteristics may include one or more of a physical layout, a physical path route from the device to another device, a ping response time comparison, and/or programmed relationship. The device 10 may determine its location coordinates based on the coordinates relationship to another device and the coordinates of another device.

In another embodiment, the devices 10 may form a network of wireless connections and wired connections to result in a larger network of devices. For example, wireless connections may used to extend the wired network into areas of the building where the wired network does not exist.

Figure 5:
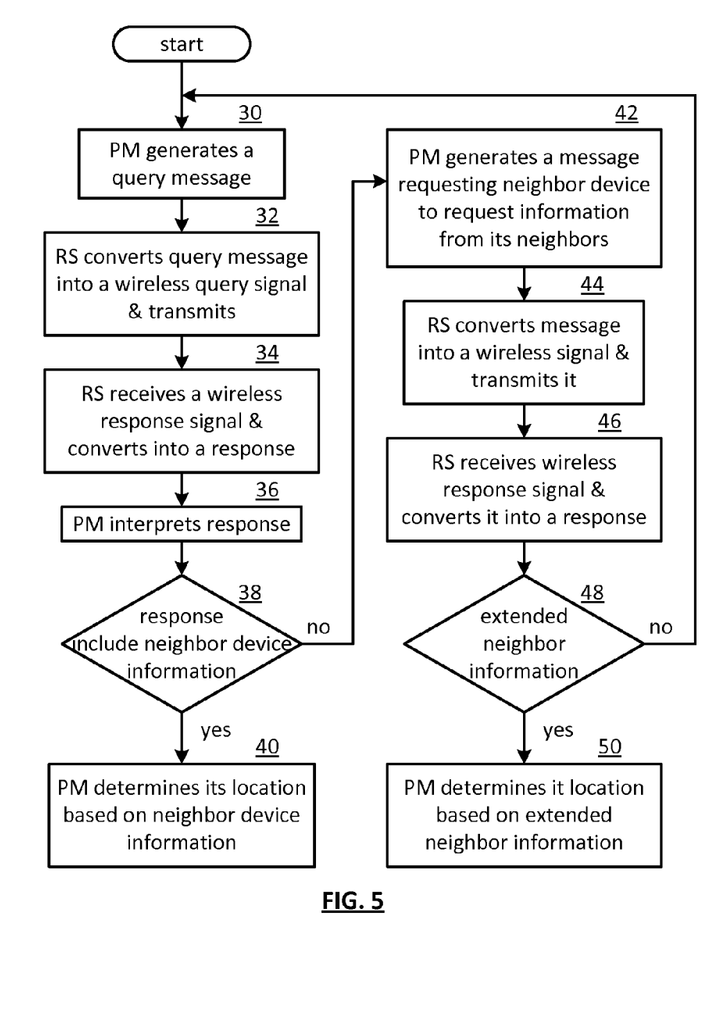
FIG. 5 is a logic diagram of an embodiment of a method for a communication device operation in accordance with the present invention.

FIG. 5 is a logic diagram of an embodiment of a method that begins at step 30 where the processing module 14 generates a query message requesting location information from at least one neighboring device. The processing module 14 may generate the query message if the devices includes a GPS receiver 24 and it cannot provide location coordinates or if the device has not otherwise determined its location from other devices. At step 32, the radio section 14 converts the query message into a wireless query signal and transmits to one or more neighboring devices. At step 34, the radio section 14 receives a wireless response signal and converts it into a response message. At step 36, the processing module 12 interprets the response message.

At step 38, the method branches to step 40 when the response includes neighboring device location information. At step 40, the processing module 12 determines the location information regarding the device 10 based on the neighboring device location information. For example, the neighboring device may be within GPS range and therefore can provide its GPS coordinates, which the processing module uses to determine its location. In another example, the neighboring device may not be within GPS range, but it has determined its location based on location information from one of its neighboring devices.

If, at step 38, the response did not include neighboring device location information, the method continues at step 42 where the processing module 12 generates a message requesting the neighboring device to request information from at least one of its neighboring devices (e.g., neighbor of a neighbor). At step 44, the radio section 14 converts the message into a wireless signal and transmits the wireless signal to the neighboring device. At step 46, the radio section 14 receives a wireless second response signal from the neighboring device and converts the wireless second response signal into the second response. The method continues at step 48 where the processing module 12 receives the second response and determines whether it includes a neighbor's neighbor location information. If not, the process repeats at step 30.

If, the second response includes device location information of a neighbor's neighboring device, the method continues to step 50 where the processing module 12 determines the location information regarding the device based on the device location information of the at least one of its neighboring devices.

Figure 6:
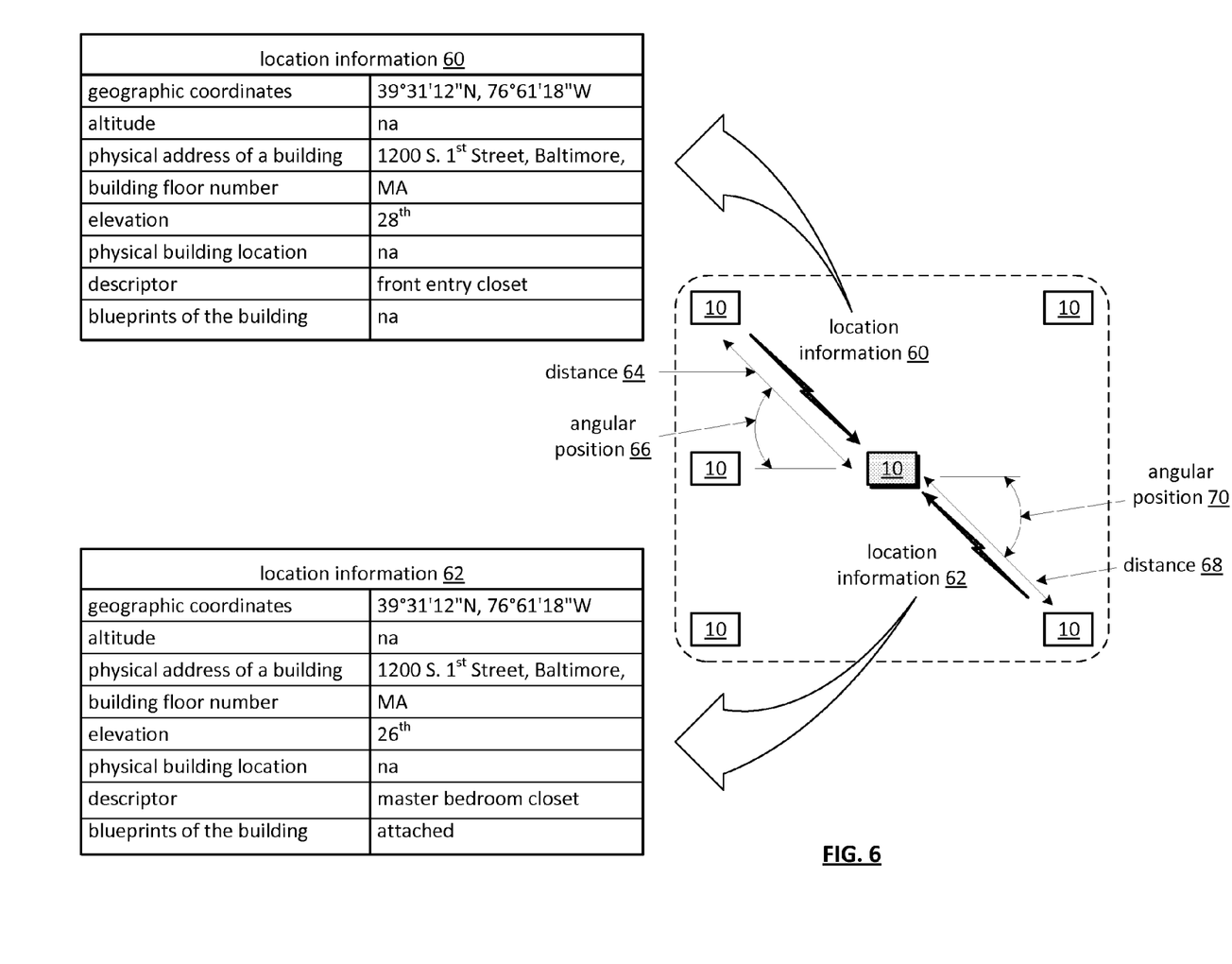
FIG. 6 is a block diagram of another embodiment of a plurality of communication devices in accordance with the present invention.

FIG. 6 is a block diagram of another embodiment of a device communicating location information 60 with a plurality of other devices 10. In this example, the highlighted device 10 has initiated wireless communications with its neighboring devices 10 and two of the devices have wirelessly responded. A first device 10 (e.g., the one in the upper left corner of the neighborhood) provides location information 60 and the second device 10 ((e.g., the one in the lower right corner of the neighborhood) provides it location information 62.

Each of the location information 60 and 62 may include one or more of geographic coordinates, altitude, physical address of a building, building floor number, elevation, physical building location descriptor, and/or blueprints of the building. As can be seen, each device has unique location information.

The highlighted device 10 determines its distance 64 and angular position 66 with respect to the first device based on the wireless signal it received from the device. In this instance, the radio section 14 and/or LAN interface 28 of the highlighted device 10 includes a multi-element antenna array that is capable of providing angle of arrival information. The device 10 calculates the distance using a sounding technique and/or timestamp technique to measure RF propagation times. For the timestamp technique, the devices need to be synchronized, which can be accomplished by syncing to one of the devices that is receiving reliable GPS signals. The highlighted device 10 also determines the distance 68 and the angular position 70 with respect to the second device in a similar manner.

From the distances 64-68, the angular positions 68-70, and the geographic coordinates of the first and second devices, the highlighted device can accurately determine its geographic location without directly receiving GPS signals. This information can then be transmitted to a portable device in its area, such that the portable device has accurate location information (e.g., geographic coordinates, elevation, and/or physical information regarding it location). Note that, the distances 64 68 and the angular positions 66 70 are typically three-dimensional in nature even though they are shown as being two-dimensional.

In another example, assume that the communication between the devices of FIG. 6 is done via a wired network. In this example, the highlighted device 10 can determine its distance and angular position with respect to the device transmitting the location information via the wired LAN interface 28. The device may determine the distance using a pinging technique or timestamp technique to measure wired network propagation times. The device may also use a network topology map, the building blueprints, and the preprogrammed location information of the other devices (e.g., 28th floor, front entry closet) to assist in determining its location.

Figure 7:
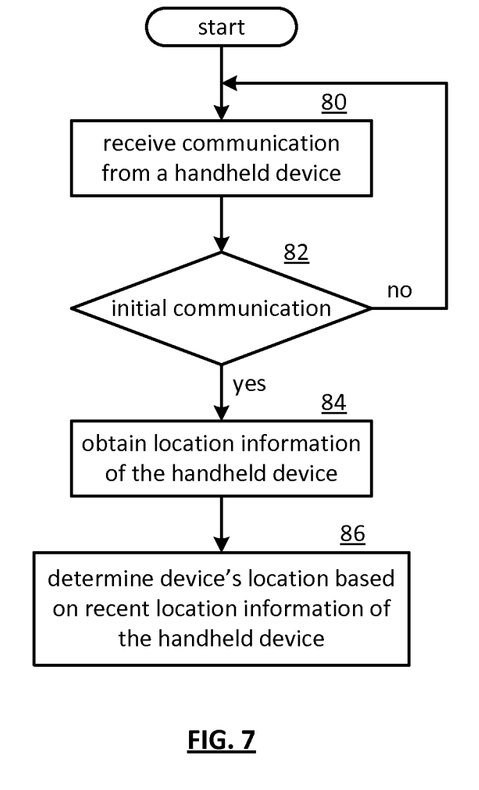
FIG. 7 is a logic diagram of an embodiment of a method for communication device operation in accordance with the present invention.

FIG. 7 is a logic diagram of an embodiment of a method that begins at step 80 where the processing module 12 receives a communication from a handheld device (e.g., a cell phone) via the radio section 14. The method continues at step 82 where the processing module determines whether this is an initial communication with the handheld device. For example, the initial communication may be the handheld device requesting registration with the device. As another example, the initial communication may be the first wireless signals transmitted by the handheld device that are detected by the device.

If this is not an initial communication, the method repeats at step 80. If, however, this is an initial communication, the method continues at step 84 where the processing module 12 obtains location information of the handheld device via the radio section 14. In other words, the device is asking the handheld device to provide its geographic coordinates, which may not be current since the handheld device is inside the building, but should be accurate up to the point the handheld device entered the building.

The process continues at step 86 where the processing module 12 determines the device's 10 location information based on, at least in part, the location information of the handheld device. For example, by having knowledge of the building, of its entry points, time stamp information, and the geographic coordinates of the handheld device as it entered the building; the device can fairly accurately determine its location (e.g., within 10 meters).

β

Figure 8:
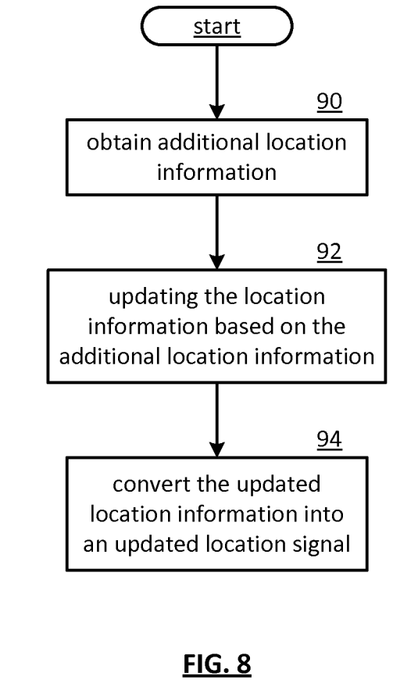
FIG. 8 is a logic diagram of an embodiment of a method for communication device operation in accordance with the present invention.

FIG. 8 is a logic diagram of an embodiment of a method for communication device operation that begins at step 90 where the processing module 12 obtains additional location information. For example, the additional location information includes updated information it has received from other devices, information from devices it has not previously received information from, information from handheld units recently entering the devices coverage area, etc.

The method continues at step 92 where the processing module 12 updates the location information based on the additional location information to produce updated location information. For instance, the previous location information of the device may be based on information from a single other device. With information from other devices, the location of the present device may be more accurately determined. When that is the case, the device's location information is updated. The method continues at step 94 where the processing module 12 converts the updated location information into an updated location signal 20 for transmission by the radio section 14.

Figure 9:
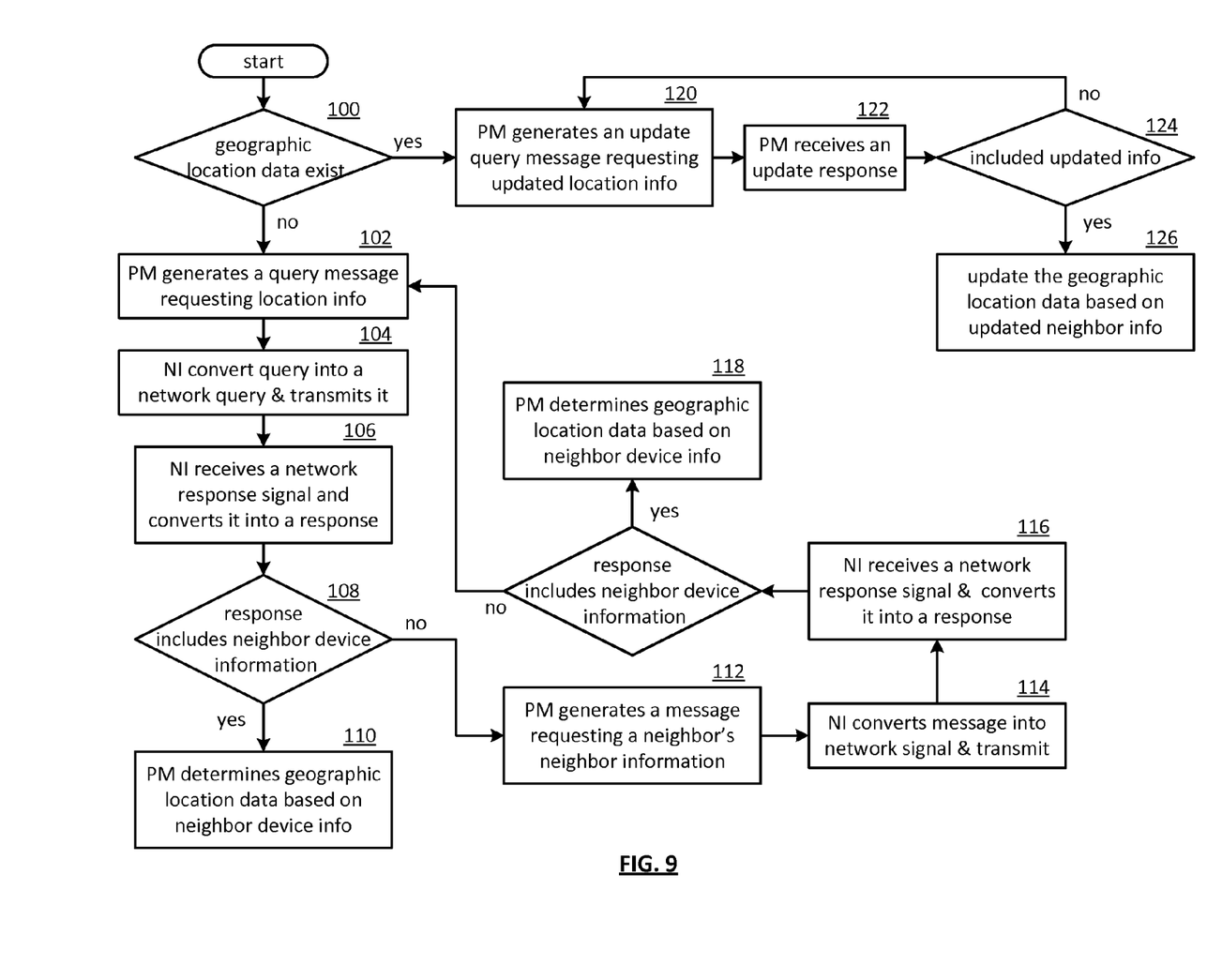
FIG. 9 is a logic diagram of an embodiment of a method for communication device operation in accordance with the present invention.

FIG. 9 is a logic diagram of an embodiment of a method that begins at step 100 where the processing module 12 determines whether geographic location data regarding the device 10 exists. The geographic location data may include geographic coordinates, longitude, latitude, altitude, elevation, information regarding its physical location (e.g., information regarding the building in which the device is located), and/or a coordinate relationship with one or more other devices 10.

If the geographic location data does not exists, the method continues at step 102 where the processing module 12 generates a query message requesting location information from at least one neighboring device. The method continues at step 104 where a network interface section converts the query message into a network query signal and transmits the network query signal. The network interface section may be a wireless network interface or a wireline network interface module as previously described with reference to the network interface 28.

The method continues at step 106 where the network interface section receives a network response signal from at least one neighboring device and converts it into a response. The method continues at step 108 where the processing module 12 receives the response and determines whether the response includes neighboring device location information. If yes, the method continues at step 110 where the processing module 12 determines the geographic location data regarding the device 10 based on the neighboring device location information.

If, at step 108, the response did not include the neighboring device location information, the method continues at step 112 where the processing module 12 generates a message requesting the at least one neighboring device to request information from at least one of its neighboring devices. The method continues at step 114 where the network interface section converts the message into a network signal and transmits it to other devices. The method continues at step 116 where the network interface section receives a second network response signal and converts it into the second response.

The method continues at step 117 where the processing module 12 receives the second response and determines whether it includes device location information of the at least one of its neighboring devices. For example, does the second response include the location information for a neighbor's neighbor, for a neighbor's neighbor's neighbor, etc. If not, the method repeats at step 102.

If the response includes the information, the method continues at step 118 where the processing module 12 determines the geographic location data regarding the device 10 based on the device location information of the at least one of its neighboring devices.

If, at step 100, the geographic location data exists, the method continues at step 120 where the processing module generates an update query message requesting updated location information from the at least one neighboring device. The method continues at step 122 where the processing module receives, via the network interface, an update response regarding the update query message. The method continues at step 124 where the processing module determines whether the update response includes updated neighboring device location information. If not, the method repeats at step 120.

When the update response includes updated neighboring device location information, the method continues at step 126 where the processing module updates the geographic location data regarding the device based on the updated neighboring device location information.

Figure 10:
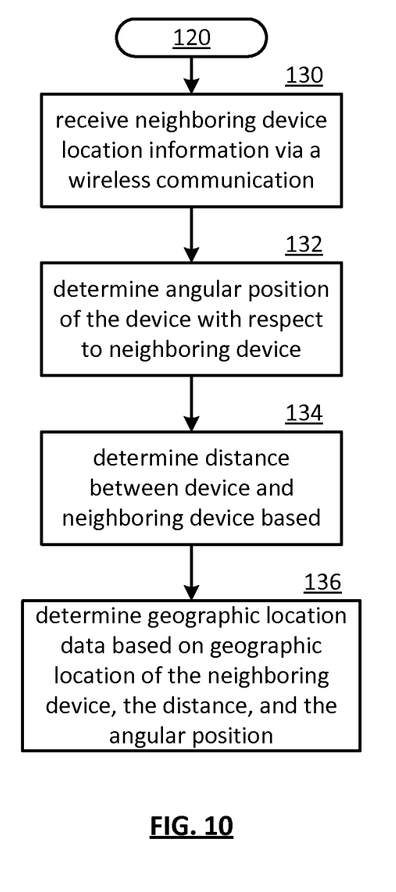
FIG. 10 is a logic diagram of an embodiment of a method for communication device operation in accordance with the present invention.

FIG. 10 is a logic diagram of an embodiment of a method for communication device operation that begins at step 130 where the processing module 12 receives the neighboring device location information via a wireless communication. The wireless communication may be received via the wireless LAN interface 28 and/or the radio section 14.

The method continues at step 132 where the processing module 12 determines an angular position of the device 10 with respect to the at least one neighboring device based on the wireless communication. An example of this was provided with reference to FIG. 6. The method continues at step 134 where the processing module 12 determines the distance between the device and the at least one neighboring device based on the wireless communication. The method continues at step 136 where the processing module 12 determines the geographic location data based on geographic location of the at least one neighboring device, the distance, and the angular position.

As an example, the location of the neighboring device may be on the $28^{th}$ floor (with an exact known set of GPS coordinates), at a distance of fifty feet (e.g., 5 floors), with angular position of straight up. If the distance per floor information included in the location information indicates that each floor is 10 feet, then the geographic relationship between the device and the neighboring device is that the device is five floors directly below the neighboring device. The processing module 12 may determine the GPS coordinates relationship based on the geographic relationship. The processing module 12 may calculate the geographic location data based on the GPS coordinates relationship.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A portable device for obtaining location information within a building, comprising:
    a local area network interface operably coupled to communicate with neighboring wired and wireless devices;
    a processing module operably coupled to:
        obtain through the local area network interface the location information regarding the portable device from one or more of the neighboring wired and wireless devices, the location information comprising at least geographic coordinates, building information and geographic relationship information between the portable device and at least one of the one or more neighboring wired and wireless devices; wherein the geographic relationship information includes distance and angle between the portable device and the one or more neighboring portable devices in the building;
        determine whether existing location information regarding the portable device is insufficient to determine the geographic coordinates, the existing location information comprising at least a portion of raw geographic location data;
        when the existing location information is insufficient, generate a query message requesting location information including at least another portion of raw geographic location data from at least one neighboring device;
        receive a response regarding the query message;
        when the response collectively includes sufficient location information when combined with the existing location information, determine the location information regarding the portable device; and
        convert the location information into a location signal; and
    a radio section operably coupled to:
        convert the location signal into a location wireless signal; and
        transmit, within a local coverage area, the location wireless signal.

2. The portable device of claim 1 further comprises at least one of:
    a Global Positioning Satellite (GPS) receiver that is operable to generate at least a portion of the location information; and
    a user interface operable to receive the location information.

3. The portable device of claim 1 further comprises:
    the processing module further operably coupled to:
        generate a query message requesting information from at least one of the one or more neighboring wired and wireless devices;
        receive a response regarding the query message;
        when the response includes neighboring device location information of the one or more neighboring wired and wireless devices, determine the location information regarding the portable device based on the neighboring device location information; and
    the radio section operably coupled to:
        convert the query message into a wireless query signal;
        transmit the wireless query signal;
        receive a wireless response signal; and
        convert the wireless response signal into the response.

4. The portable device of claim 3 further comprises:
the processing module further operably coupled to:
when the response does not include at least a portion of the neighboring device location information or no response is received, generate a message requesting the at least one of the one or more neighboring wired and wireless devices to request information from at least one of its neighboring devices;
receive a second response to the message;
when the second response includes the at least a portion of the location information of the at least one of its neighboring devices, determine the location information regarding the portable device based on the at least a portion of the location information of the at least one of its neighboring devices; and
the radio section operably coupled to:
convert the message into a wireless signal;
transmit the wireless signal;
receive a wireless second response signal; and
convert the wireless second response signal into the second response.

5. The portable device of claim 1 further comprises:
the processing module further operably coupled to:
receive, via the radio section, a communication from a handheld device;
determine whether the communication is an initial communication with the handheld device;
when the communication is an initial communication, obtain, via the radio section, location information of the handheld device; and
determine the location information regarding the portable device based on, at least in part, the handheld device location information.

6. The portable device of claim 1 further comprises:
the processing module further operably coupled to:
indicate that the location signal is to be broadcasted; or
generate the location signal in response to a location request; and
the radio section further operably coupled to:
transmit the location wireless signal as a broadcast wireless signal when the location signal is to be broadcasted; or
transmit the location wireless signal in accordance with the location request.

7. The portable device of claim 1, wherein the radio section comprises at least one of:
a radio frequency (RF) radio section that includes:
one or more RF transmitter sections, wherein an RF transmitter section of the one or more RF transmitter sections is operably coupled to:
convert the location signal into a location RF signal; and
transmit, within the local coverage area, the location RF signal;
a millimeter wave (MMW) radio section that includes:
one or more MMW transmitter sections, wherein an MMW transmitter section of the one or more MMW transmitter sections is operably coupled to:
convert the location signal into a location MMW signal; and
transmit, within the local coverage area, the location MMW signal.

8. The portable device of claim 1, wherein the building information comprises at least one of:
physical address;
floor number;
elevation;
physical location descriptor; and
blueprints.

9. The portable device of claim 8, wherein the processing module is further operably coupled to convert the location information into the location signal by:
determine position of the portable device within the building based on at least the geographic coordinates, the building information and the geographic relationship;
determine geographic location based on the position of the portable device within the building; and
generate the location signal based on the geographic location.

10. A portable device for determining geographic location within a building comprising:
a processing module operably coupled to:
determine whether existing geographic location data regarding the portable device is insufficient to determine geographic coordinates, the existing geographic location data comprising at least a portion of raw geographic location data; wherein geographic location data comprises at least geographic coordinates, building information and geographic relationship information and the geographic relationship information includes distance and angle between the portable device and one of one or more devices;
when the existing geographic location data is insufficient, generate a query message requesting geographic location data including at least another portion of raw geographic location data from at least one neighboring device;
receive a response regarding the query message;
when the response collectively includes sufficient geographic location data when combined with the existing geographic location data, determine the geographic location regarding the portable device; and
a network interface section operably coupled to:
convert the query message into a network query signal;
transmit the network query signal;
receive a network response signal; and
convert the network response signal into the response.

11. The portable device of claim 10, wherein the processing module is further operably coupled to determine additional geographic location data regarding the portable device by:
receiving the neighboring device location information via a wireless communication;
determining an angular position of the portable device with respect to the at least one neighboring device based on the wireless communication;
determining distance between the portable device and the at least one neighboring device based on the wireless communication; and
determining the geographic location data based on geographic location of the at least one neighboring device, the distance, and the angular position.

12. The portable device of claim 10 further comprises:
the processing module further operably coupled to:
when the response does not include the geographic location data of the neighboring device or no response is received, generate a message requesting the at least one neighboring device to request geographic location data from at least one of its neighboring devices;
receive a second response to the message;
when the second response includes geographic location data of the neighboring device location information of the at least one of its neighboring devices, determine the geographic location regarding the portable device based on the neighboring device location geographic location data of the at least one of its neighboring devices; and the network interface section further operably coupled to:
convert the message into a network signal;
transmit the network signal;
receive a second network response signal; and
convert the second network response signal into the second response.

13. The portable device of claim 10, wherein the network interface section comprises at least one of:
a wireless network interface transceiver; and
a wireline network interface module.

14. The portable device of claim 10, wherein the processing module is further operably coupled to:
when the geographic location data does exist, generate an update query message requesting updated geographic location data from the at least one neighboring device;
receive, via the network interface, an update response regarding the update query message;
when the update response includes updated neighboring device geographic location data, update the geographic location regarding the portable device based on the updated neighboring device geographic location data.

15. The portable device of claim 10, wherein the geographic location data includes building data comprising at least one of:
physical address;
floor number;
elevation;
physical location descriptor; and
blueprints.

16. The portable device of claim 10, wherein the processing module is further operably coupled to:
obtain additional location information; and
updating the geographic location data based on the additional location information to produce updated geographic location data.

17. A method of providing geographic location data for a portable device within a building comprising:
determining for each of a plurality of neighboring wired and wireless location devices located within the building whether geographic location data regarding the portable device exists, the geographic location data comprising at least: geographic coordinates, geographic relationship information and building information data; wherein the geographic relationship information includes distance and angle between the portable device and one or more of the neighboring wired and wireless location devices and at least one additional neighboring location device;
when the geographic location data does not exist, generating a query message requesting additional geographic location data from the at least one additional neighboring location device of the neighboring wired and wireless location devices;
converting the generated query message into a network query signal by a network interface section;
receiving a response regarding the network query signal;
when the response includes additional geographic location data for the portable device, determining the geographic location regarding the portable device based on the additional geographic location data device location information;
converting the geographic location data into a location communications signal; and
transmitting, within the local coverage area, the location communications signal.

18. The method of claim 17, wherein the building data comprises at least one of:
physical address;
floor number;
elevation;
physical location descriptor; and
blueprints.

* * * * *